(12) United States Patent
Eldredge et al.

(10) Patent No.: US 11,659,818 B2
(45) Date of Patent: May 30, 2023

(54) LIVESTOCK FEED PROXIMITY AND UNMETABOLISED PHARMACEUTICAL MONITORING SYSTEM

(71) Applicant: Tricon Sales LLC, Seattle, WA (US)

(72) Inventors: Kent Deric Eldredge, West Jordan, UT (US); Howard Gene Trott, Kirkland, WA (US); Anand Rajaratnam, Seattle, WA (US); Mark Alexander Thomas, Seattle, WA (US); Scott A. Bevan, Lehi, UT (US)

(73) Assignee: Tricon Sales LLC, Seattle, WA (US)

( * ) Notice: Subject to any disclaimer, the term of this patent is extended or adjusted under 35 U.S.C. 154(b) by 162 days.

(21) Appl. No.: 17/184,482

(22) Filed: Feb. 24, 2021

(65) Prior Publication Data

US 2021/0259213 A1    Aug. 26, 2021

Related U.S. Application Data

(60) Provisional application No. 62/982,024, filed on Feb. 26, 2020.

(51) Int. Cl.
*A01K 29/00* (2006.01)
*G01W 1/02* (2006.01)
(Continued)

(52) U.S. Cl.
CPC .............. *A01K 29/005* (2013.01); *A01K 5/00* (2013.01); *A01K 7/00* (2013.01); *A01K 11/004* (2013.01); *G01W 1/02* (2013.01)

(58) Field of Classification Search
CPC ........ A01K 29/00; A01K 29/005; A01K 5/00; A01K 7/00; A01K 11/00; A01K 11/002; A01K 11/004; A01K 11/008; G01W 1/02
See application file for complete search history.

(56) References Cited

U.S. PATENT DOCUMENTS 3,553,441 A * 1/1971 Launder .................. G06F 17/18
                                                                      377/55
3,557,758 A * 1/1971 Lack ........................ A01J 5/04
                                                                      119/51.02

(Continued)

*Primary Examiner* — Ebony E Evans
(74) *Attorney, Agent, or Firm* — Davis Wright Tremaine LLP; Michael J. Donohue (57) ABSTRACT

Techniques for monitoring the individual feed and water intake and pharmaceutical use and unmetabolized residual alerting in the livestock industry. Livestock have sensors installed on or in their bodies to detect consumption of feed and water for each animal in an environment where multiple animals are present. Sensors communicate data regarding the duration and timing of individual animals feeding habits. Health and efficiency status data is recorded per animal and analyzed to determine whether to issue an alert indicating problems with individual animals. The system tracks the health and efficiency data for each animal, pen or farm and generates statistical information regarding the sensor data. The system communicates with user interface to display notifications and statistical data. In addition, the pharmaceutical monitoring system alerts when any unmetabolized residual pharmaceuticals are still in the animals when the animal is being readied for shipping to a packing plant.

23 Claims, 6 Drawing Sheets

(51) Int. Cl.
*A01K 7/00* (2006.01)
*A01K 5/00* (2006.01)
*A01K 11/00* (2006.01)

(56) References Cited

U.S. PATENT DOCUMENTS

| | | | | |
|---|---|---|---|---|
| 3,750,626 A * | 8/1973 | Smith | ............. | G07F 7/025 |
| | | | | 377/55 |
| 3,929,277 A * | 12/1975 | Byrne | ............. | G06K 17/0022 |
| | | | | 119/51.02 |
| 4,049,950 A * | 9/1977 | Byrne | ............. | G01G 17/08 |
| | | | | 119/51.02 |
| 4,288,856 A * | 9/1981 | Linseth | ............. | G01G 17/08 |
| | | | | 119/51.02 |
| 4,498,424 A * | 2/1985 | Leuschner | ............. | A01K 5/0216 |
| | | | | 119/51.01 |
| 4,510,495 A * | 4/1985 | Sigrimis | ............. | G07C 9/28 |
| | | | | 340/12.51 |
| 4,517,923 A * | 5/1985 | Palmer | ............. | G01G 17/08 |
| | | | | 119/51.02 |
| 5,008,821 A * | 4/1991 | Pratt | ............. | A01K 5/02 |
| | | | | 119/51.01 |
| 5,461,807 A * | 10/1995 | Johnson | ............. | A01K 11/006 |
| | | | | 40/300 |
| 5,559,716 A * | 9/1996 | Gaalswyk | ............. | A01K 5/02 |
| | | | | 702/45 |
| 5,673,647 A * | 10/1997 | Pratt | ............. | G06Q 10/087 |
| | | | | 119/842 |
| 5,803,906 A * | 9/1998 | Pratt | ............. | A01K 5/02 |
| | | | | 600/300 |
| 5,901,660 A * | 5/1999 | Stein | ............. | A01K 29/005 |
| | | | | 119/908 |
| 7,670,292 B2 * | 3/2010 | Haynes | ............. | G16H 50/20 |
| | | | | 600/443 |
| 7,681,527 B2 * | 3/2010 | Pratt | ............. | G06Q 10/0833 |
| | | | | 119/174 |
| 10,561,365 B2 * | 2/2020 | Newman | ............. | A61B 5/4806 |
| 10,986,817 B2 * | 4/2021 | Singh | ............. | A01K 11/004 |
| 11,071,279 B2 * | 7/2021 | Singh | ............. | A01K 11/008 |
| 2006/0106289 A1 * | 5/2006 | Elser | ............. | A61B 7/003 |
| | | | | 600/300 |
| 2019/0183097 A1 * | 6/2019 | Couse | ............. | G01S 13/0209 |

* cited by examiner

LIVESTOCK FEED PROXIMITY AND UNMETABOLISED PHARMACEUTICAL MONITORING SYSTEM

CROSS-REFERENCE TO RELATED APPLICATIONS

This application claims the benefit of U.S. Provisional Patent Application No. 62/982,024, filed Feb. 26, 2020, entitled "LIVESTOCK FEED PROXIMITY AND UNMETABOLISED PHARMACEUTICAL MONITORING SYSTEM," the disclosure of which is herein incorporated in its entirety.

BACKGROUND OF THE INVENTION

Field of the Invention

The present invention relates to the field of livestock production, and more particularly, to systems and methods for monitoring the health and efficiency of livestock by monitoring the duration and time spent feeding, and alerting feedlot staff when unmetabolized residual pharmaceuticals have not yet run their course before being shipped to a packing plant.

Description of the Related Art

The livestock industry is a multi-billion dollar business. Beginning at the producer or ranch level, owners typically raise animals until they are a certain age and weight. Livestock owners sell a majority of their animals via local auction sale barns or through order buyers. Sometimes the livestock are purchased by buyers acting on behalf of feedlots or stocker operations. After sorting and co-mingling the animals, which may occur several times, the animals are sold to feedlots or stocker operations. Typically, all animals eventually end up at feedlots (sold or under retained ownership) where they are grown to selling weight. Finally, the livestock are sold to packers (e.g., a slaughterhouse) for harvesting and delivery to retail and food service distributors. Throughout this process, the livestock industry must meet consumer demands for quality, consistency, animal welfare, cost, and convenience.

The efficiency with which inputs are converted to end product in the livestock industries, specifically beef, are the primary driver of profitability. Feed costs are the single largest variable expense in that efficiency calculation. Mitigating environmental risks (improving pen conditions, removing sick animals to prevent the spread of disease, early intervention/treatment can reduce lost production as well as use lower cost pharmaceuticals). Ultimately, it is the time spent in feedlots, and the efficiency at which cattle can gain weight, which will determine if an individual animal is profitable.

A large number of animals are typically held in any given feedlot. With a large number of animals, it is difficult or impossible for feedlot staff to adequately monitor any individual animal. Therefore, it can be appreciated that there is a need for a system and method to the health and efficiency of animal production. The present disclosure provides this and other advantages, as will be apparent from the following description.

BRIEF DESCRIPTION OF THE SEVERAL VIEWS OF THE DRAWING(S)

FIG. 1-1 illustrates an enlargement of a food bunk area from the illustration of FIG. 1.

FIG. 1-2 illustrates an enlargement of a watering station from the illustration of FIG. 1.

FIG. 2-1 illustrates an exemplary embodiment of the Target Object Sensor.

FIG. 2-2 illustrates an exemplary embodiment of the Target Object Sensor with the various components in more detail.

DETAILED DESCRIPTION OF THE INVENTION

Livestock, such as cattle, can be held in feedlots or feed yards whether in a single lot or multiple lots designed for animal feeding operation for a long duration of time. A feedlot may contain varying amounts of animals. Typically 10-100 animals are held per pens. A feed lot's typical dimensions are in the range of 30×30 meters (m) to 100×100 m. Large feeding operation sites are often comprised of feedlot grids that are a row of feedlots enclosed by fences, in proximity to a service road. Along the service road is a feed bunk, which is a depository for all the feed for animals in that pen. While it is known how much feed is dispensed to the pen, there is no granularity as to which animal is consuming how much feed per day. Animals that are sick may go days without eating, due to lack of appetite, until feedlot staff notice.

Such feedlot sites are typically located in far rural areas and usually far off from the farm offices and infrastructures. A single farm can manage several feedlot sites that are separated from each other. A feedlot typically contains all the necessary elements for the animal such as water, food and other essentials. Feedlot staff ensure animal's welfare, health and other needs.

In many of the rural communities where feedlot operations exist, finding qualified feedlot staff can be difficult. Given that it takes years of working in these operations to understand the nature of the animals, having a process which helps the staff still developing an understanding of the animals manage the large numbers of animals in these large distributed operations is beneficial.

This monitoring process can be done in person, or electronically. Cattle like other livestock animals are prone to disease that causes several challenges. The first challenge is economic—ill cattle for example requires additional special treatment, such as human labor for the separation and treatment, special equipment and medicine are also required. In some cases, the disease will cause the animal's death—resulting in more economical loss. Ill cattle will also require more feed as it takes them more time to be brought back to health.

Different diseases are caused by a bacteria, virus, or other agents. Cattle disease influences different systems in the organism such as the respiratory, digestive, reproductive, neurological or other systems and can be expressed by a large variety of symptoms. Such symptoms can include, but not limited to: coughing, nasal and eye discharge, salivation, depression, lack of appetite and dullness, as well as other symptoms. While there exist different methods for evaluating these symptoms, opportunities exist to find more granular methods for understanding each of the possible ways these illnesses may demonstrate themselves and thus shorten the time taken to convert the animal to profit.

In an industry that has an increase in concentration of animals in larger and larger operations, understanding the nuances in individual animals when identifying the number of times and animals visits the bunk and water, and the time spent actually eating and drinking versus standing near the bunk or water without eating or drinking, will give a feedlot operator the necessary information to make informed health decisions on every animal while continuing to grow operations economically.

Finally, when illness or other problems are detected, many individual animals are given pharmaceuticals to counter any health threat that may be biological (e.g., virus or bacteria). These pharmaceuticals will required to be entirely out of the animal's system before being shipped to the packing plant. If they are mistakenly sent to the plant, then they will not be processed and they will be returned to the feedlot at the expense of the feedlot operator, and to the detriment of the animal, as it will have stressed by the trip to the packing plant, and will thus lose weight. In many cases the animal will often need another 30-45 days to get back to the correct weight to be returned to the packing plant had the initial trip not happened. As described above, since feed if the highest contributing factor in whether an animal is profitable or not, eliminating this additional 30-45 days is significant.

In the following description, various embodiments for livestock monitoring will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to comprehensive systems and methods for monitoring the efficiency of food intake. The comprehensive system may actively manage the feed monitoring and thus health and efficiency of livestock. In particular, the system can detect and compare individual animals and compare them to other animals in the feedlot pen, thus exposing ill or injured animals, and inefficient utilization of inputs (examples: feed, pharmaceuticals, implants, protein, roughage, water, etc.).

Figure 1:
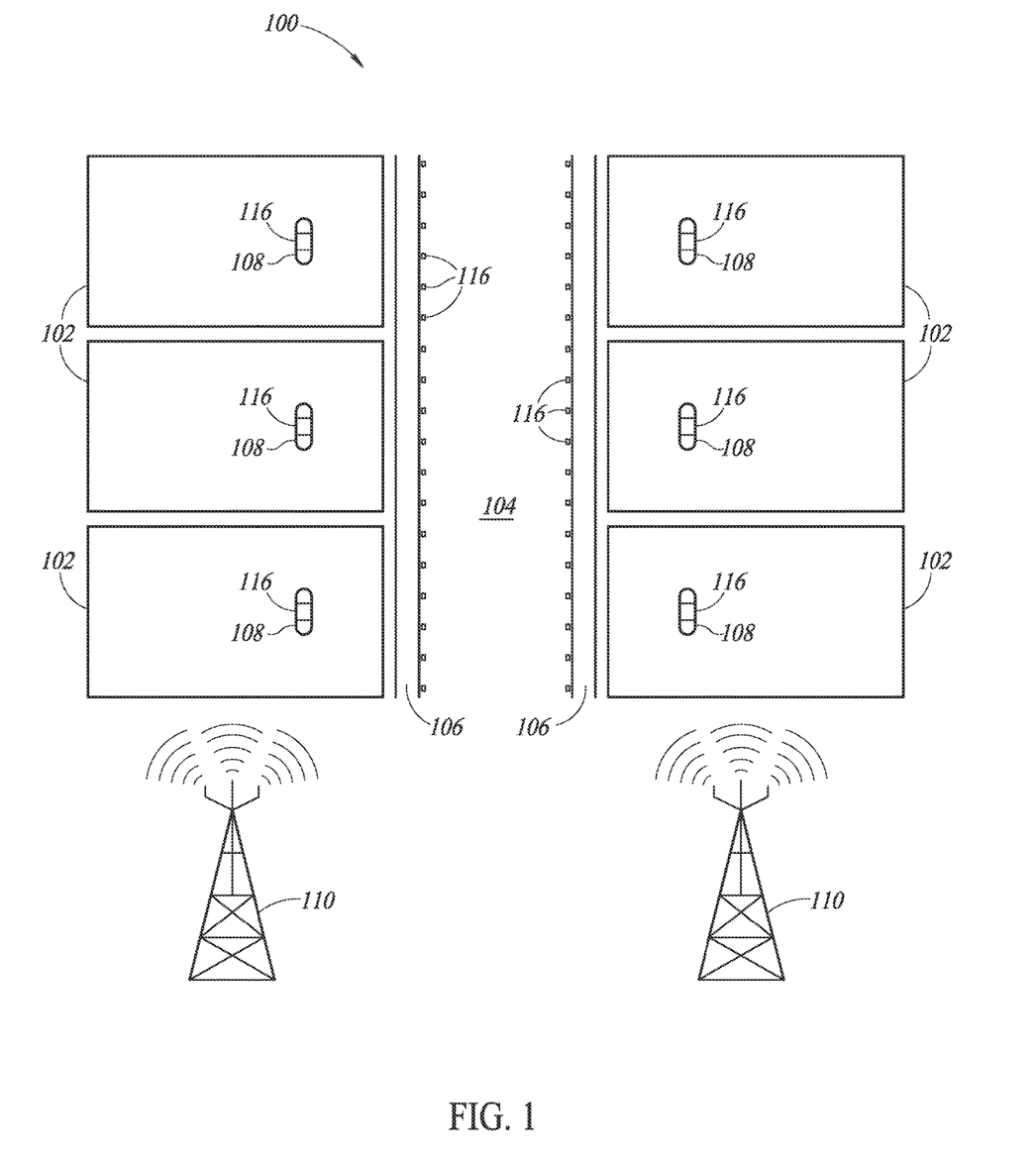
FIG. 1 illustrates an example of a feedlot operation.

FIG. 1 illustrates an example of a typical feedlot operation 100 in which pens 102 are lined up next to each other with a central road in between the pens illustrated on the left and right of FIG. 1. A food dispensing truck (not shown) drives down the central road 102 and dispenses large amounts of food into food bunks 106 for the pens 102. Although it is known how much food is delivered to the food bunks 106, prior art systems cannot determine how much of the food is consumed by individual animals in the pens 102.

Figure 2:
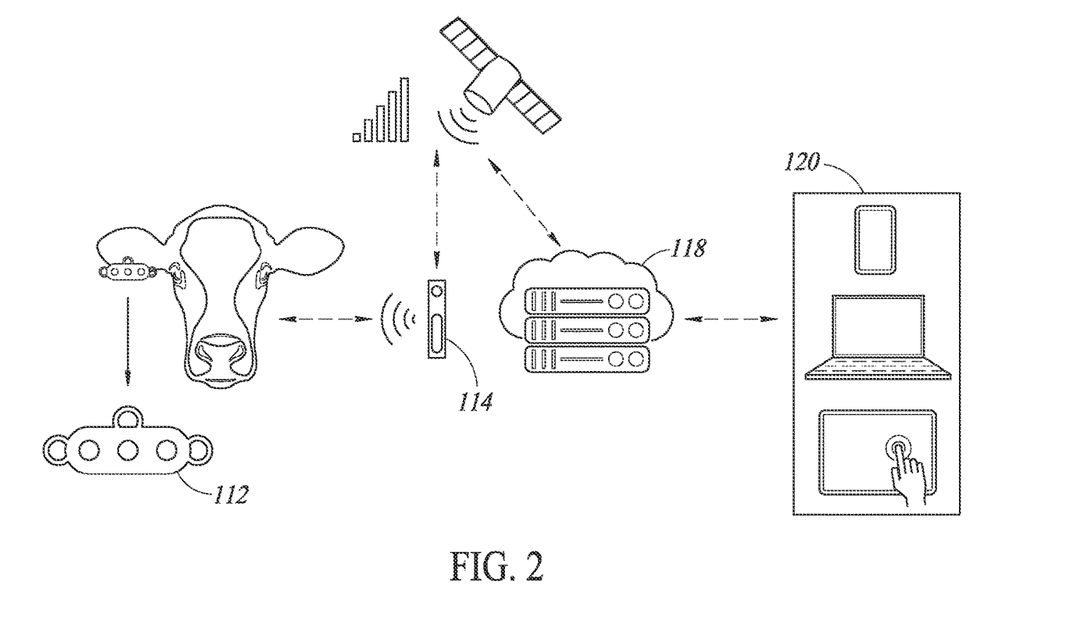
FIG. 2 illustrates the entire Network from Target Object Sensor to Data Acquisition and Communication Unit to Data Backhaul to Server Processing Unit.

FIG. 1 also illustrates a series of transceivers 110 that are configured to relay data from sensors, referred to herein as a target object sensor unit 112 (see FIG. 2), mounted on the individual animals, to a central data acquisition and communication unit (DACU) 114 (see FIG. 2). The target object sensor 112 uniquely identifies each animal. Depending on the particular communication technology used to implement the transceivers, one or more transceivers 110 are positioned around the feedlot 100. The precise location of the transceivers 110 to provide coverage for the entire feedlot 100 is within the engineering expertise of one of ordinary skill in the art and need not be described in greater detail herein.

Figure 11:
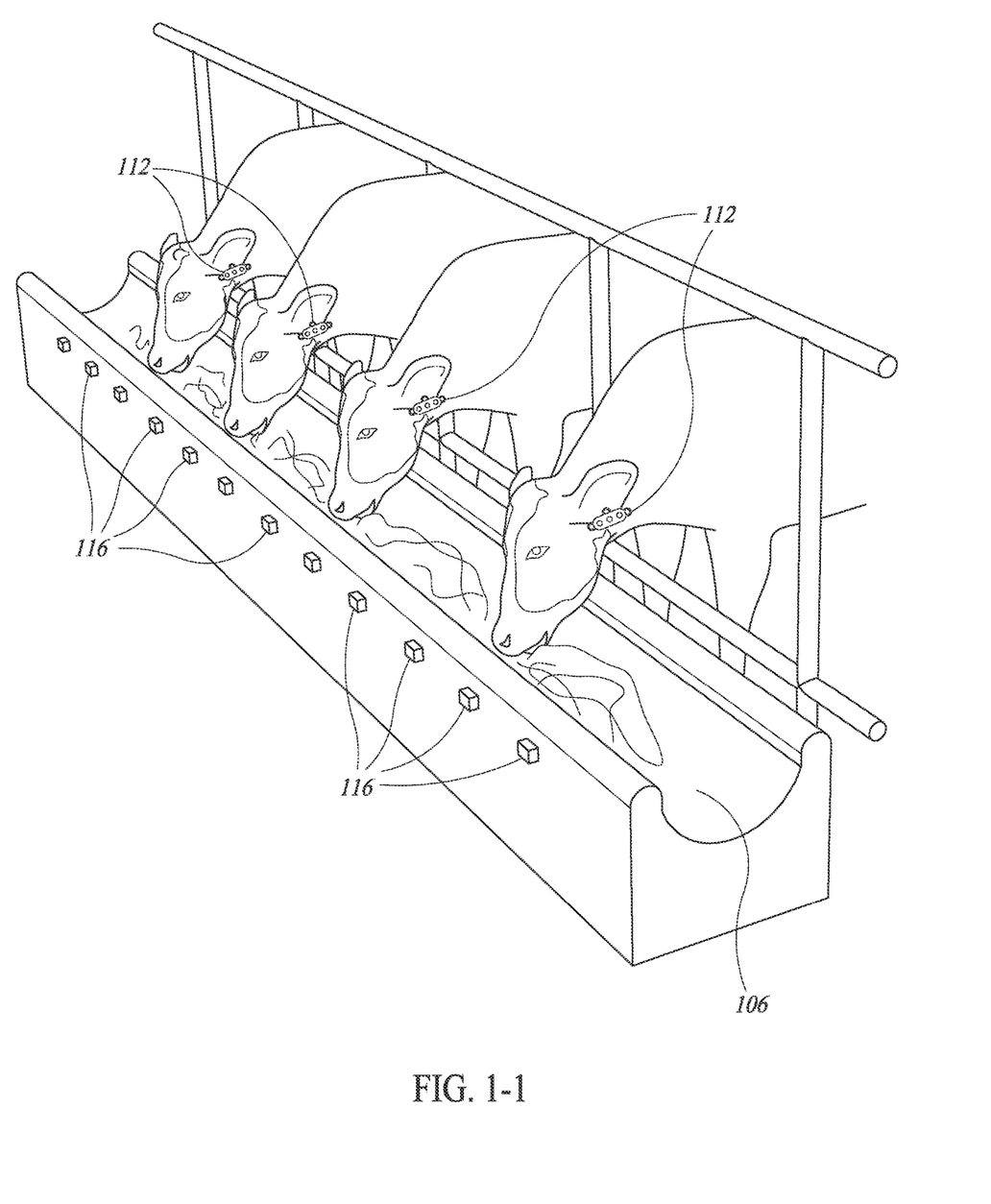
Figure 12:
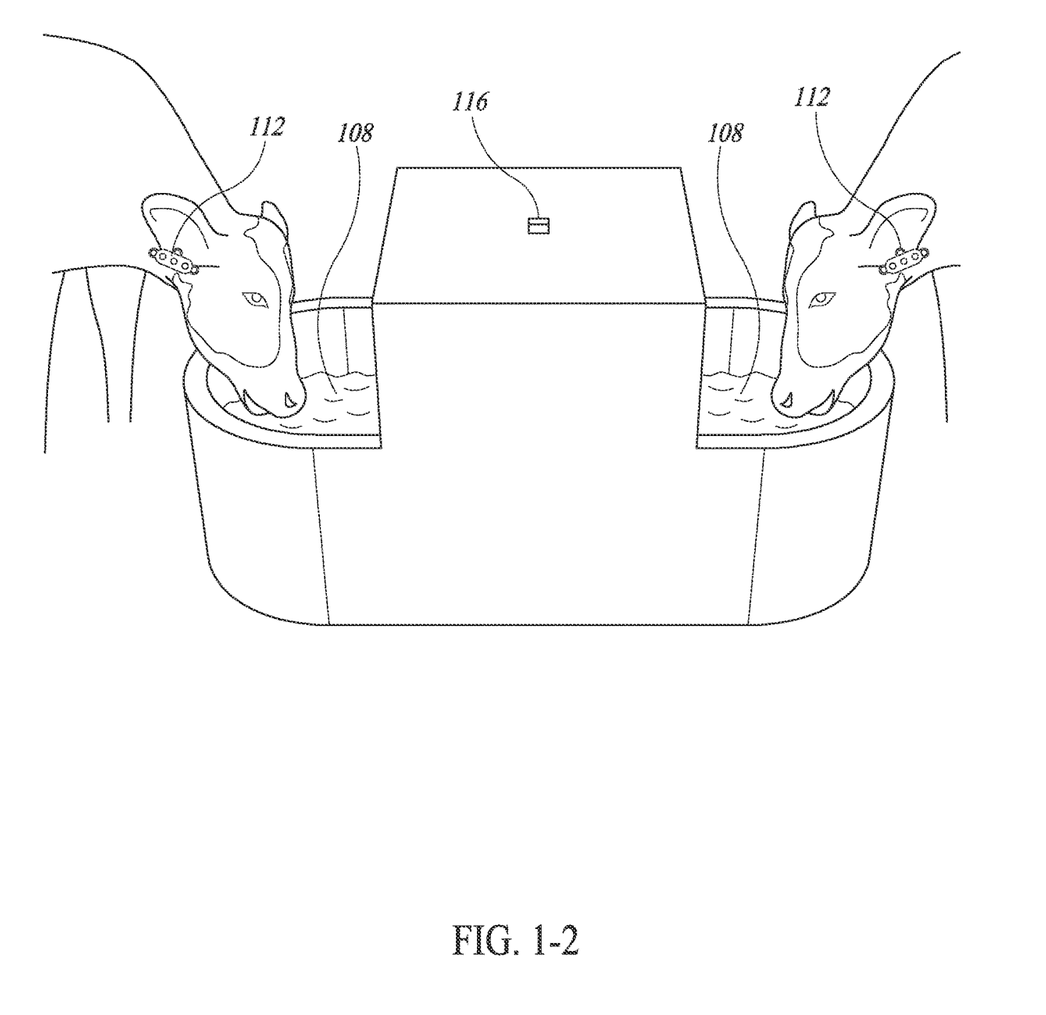

FIG. 1-1 illustrates a close-up view of a food bunk 106 in the feedlot 102. As individual animals move into close proximity with the food bunk 106, the target object sensor 112 placed on the ears of each livestock (sometimes referred to as an ear tag) will interact with emitter units 116 placed near the food bunk 106 to trigger a signal indicating that the individual animal is at the food bunk. Similarly, FIG. 1-2 illustrates a close-up view of a water station 108 of the feedlot. The water station 108 also includes a series of emitter units 116 that detect the presence of the target object sensor 112 to thereby indicate that individual animals are present at the water station.

Figure 22:
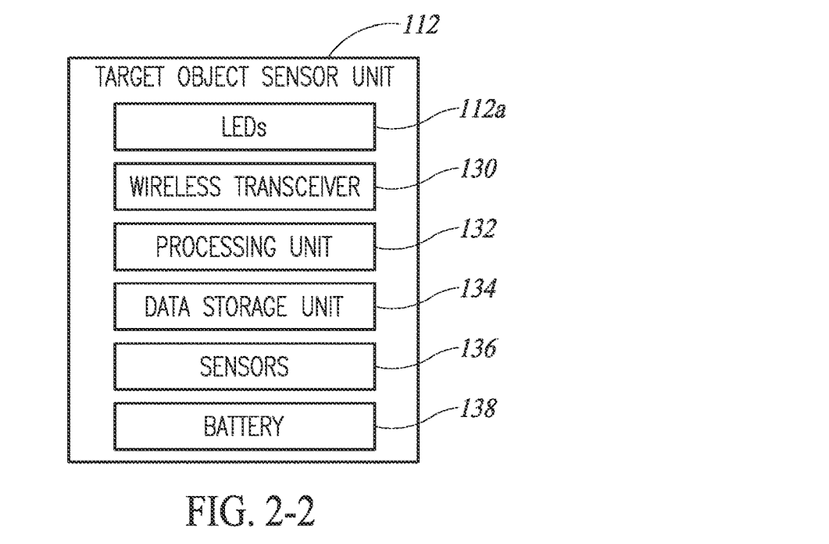

In one embodiment, the system employs small battery powered sensors (See FIG. 2-2) as the target object sensors 112. The target object sensors 112 interact with emitter units 116, such as magnets, or electro-magnetic transmitters, or different isotopes located at the feed bunks or watering stations. The target object sensors 112 wirelessly communicate with small computing devices (see FIG. 3), which in turn are connected to processors and/or servers 118, which may be cloud-based.

FIG. 2 illustrates an exemplary embodiment of a communication architecture for the system. The target object sensor 112 attaches to a convenient location on the animal, such as the ear. Details of the target object sensor 112 are provided below with respect to FIG. 2-2. The target object sensor 112 includes a short-range transceiver 130 that communicates with the DACU 114 either directly or via the transceivers 110 illustrated in FIG. 1. The DACU 114 is configured to communicate wirelessly with the server/processing unit 118. In one embodiment, the DACU 114 includes a cellular communication link for the wireless communication. In another embodiment, the DACU 114 includes a satellite communication link. Alternatively, the DACU 114 can include both cellular and satellite links. Those skilled in the art will appreciate that the DACU 114 can employ other forms of communication links with the server/processing unit 118, including a conventional radio transceiver (e.g., GPRS), microwave, hardwired communication link (e.g., a conventional telephone system), and the like, which may be used alone or in combination in the DACU.

The server/processing unit 118 logs and analyzes the received data. If any of the data indicates a potential problem with an animal, the server/processing unit generates an alert to the feedlot staff or others via a user interface 120.

The network of devices illustrated in FIG. 2 further pulls data from third party services, such as weather services (e.g., NOAA, Accu-weather) and animal health and sourcing records. Sensor data and third-party data may then be automatically processed and analyzed by the server/processing unit 118 (See FIG. 4) to provide real-time health and efficiency monitoring and alerts to users in management roles as well as workers in the field.

Figure 21:
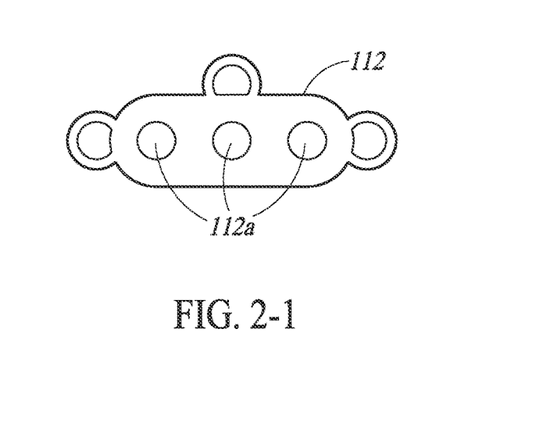

The data may be further used to generate statistics and inform artificial intelligence to determine additional optimizations in the amounts the animals should be eating or drinking. Furthermore, animals with health or feeding issues can be more easily identified by illuminating specific LEDs 112a on the target object sensor 112 (See FIG. 2-1) that are associated with a specific action/treatment. The LEDs 112a are activated in response to a command sent to the transceiver 130 in the selected target object sensor 112. Finally, as these animals are being readied for transport, the system will also alert feedlot staff that specific animals have not been given sufficient time for pharmaceuticals to leave their system, and therefore should not be transported to the packing plant.

FIG. 2-1 illustrates the target object sensor 112 that is attached to the animal. In an exemplary embodiment the target object sensor 112 includes a number of sensors 136 (see FIG. 2-2), such as an accelerometer, gyroscope, magnetometer, thermometer, barometric pressure sensor, and hygrometer. These various sensors 136 can be used to generate sensor data about the individual animal, its environment, and the surrounding feedlot environment. The target object sensor 112 includes a battery 138 (see FIG. 2-2) that is configured to power the target object sensor and a low-power communication unit (e.g., the transceiver 130) for years without replacement.

In one embodiment, the transceiver 130 is configured for operation in accordance with IEEE 802.15.4. However, other low power transceivers can be used satisfactorily with the system. The system is not limited by the particular form of the transceiver 130 with the target object sensor 112. In yet another exemplary embodiment, the target object sensor 112 can communicate directly with a satellite using a satellite link. This embodiment can eliminate the need for the DACU 114.

FIG. 2-2 is a functional block diagram of the target object sensor 112. It includes the wireless transceiver 130. Each target object sensor 112 also includes the sensors 136 and battery 138, as discussed above.

Each target object sensor 112 also includes a central processing unit (CPU) 132 to control operation of the target object sensor 112. Those skilled in the art will appreciate that the CPU 132 may be implemented as a conventional microprocessor, application specific integrated circuit (ASIC), digital signal processor (DSP), programmable gate array (PGA), or the like. The target object sensor 112 is not limited by the specific form of the CPU 132.

The target object sensor 112 also contains a memory illustrated as a data storage unit 134 in FIG. 2-2. In general, the memory stores instructions and data to control operation of the CPU 132. The memory may include random access memory, ready-only memory, programmable memory, flash memory, and the like. The target object sensor 112 is not limited by any specific form of hardware used to implement the memory. The memory may also be integrally formed in whole or in part with the CPU.

Figure 3:
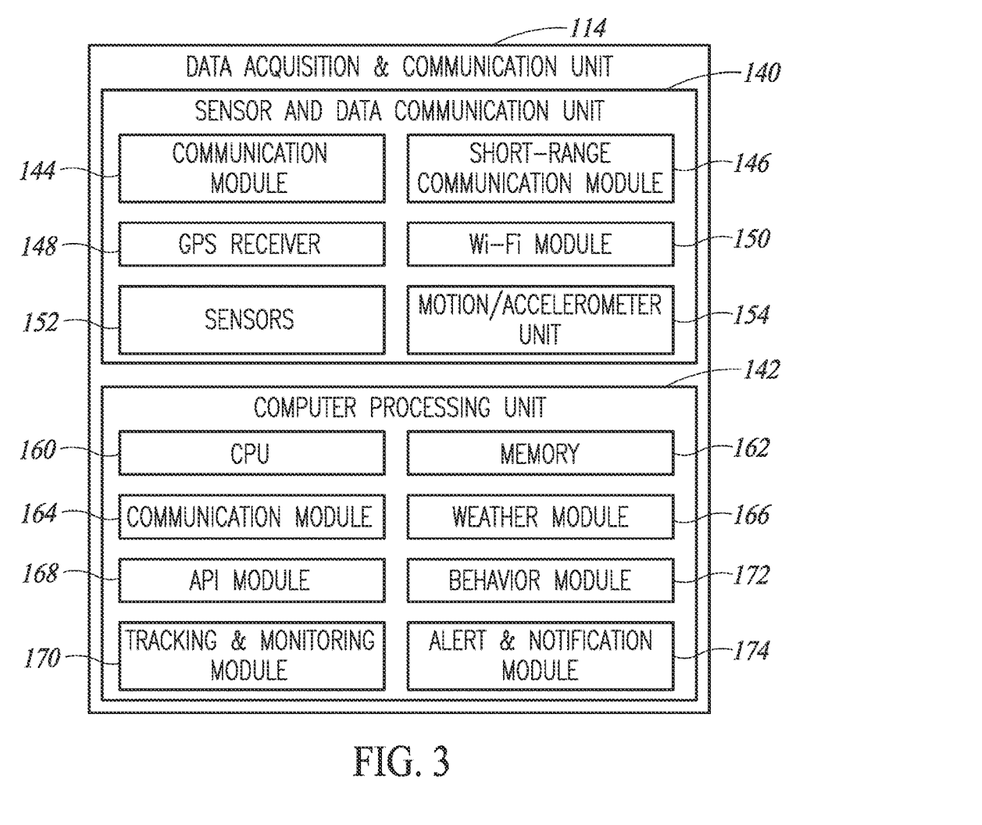
FIG. 3 illustrates an exemplary embodiment of the Data Acquisition and Communication Unit with various components.

FIG. 3 is a functional block diagram of the DACU 114. As illustrated in the exemplary embodiment of FIG. 3, the DACU 114 includes a sensor and data communication unit 140 and a computer processing unit 142. The sensor and data communication unit 140 includes a communication module 144 for communicating with the server/processing unit 118 in the manner described above. The sensor and data communication unit 140 includes a short-range communication module 146 for communicating with all of the target object sensors 112 in the manner described above.

The sensor and data communication unit 140 can include a GPS receiver 148 and a WiFi communication module 150. The GPS receiver 148 provides the exact location of the DACU 114, to associate with the surrounding pens 102. It is a confirmation of location. The WiFi communication module 150 may be used to upload updates at a local level that require a broad band connection.

In addition, the sensor and data communication unit 140 can include sensors 152, such as a barometer, or other weather sensing unit. These sensors on the DACU provide data that may be needed to understand how weather or other outside data may affect the eating behaviors of the animals, signaling that another source other than illness may be affecting the eating behaviors. The sensor and data communication unit 140 can also include an accelerometer 154 or other motion detector unit.

The computer processing unit 142 of the DACU 114 includes conventional computer components, such as a CPU 160 and memory 162 discussed above with respect to the target object sensor 112.

FIG. 3 illustrates a number of modules, including a:

Communication Module 164—provides communicate link with, for example, the cell tower and/or the satellite to convey data to the remote server/processing unit 118 (see FIG. 2);

Weather Module 166—analyzes local weather data, or weather data downloaded from the server/processing unit 118 or uploaded from the target object sensor 112;

API Module 168—provides interoperability that permits networks/systems/components written in different languages to talk with each other;

Tracking and Monitoring Module 170—provides localized data monitoring and tracking of animals in the event that the communication link with the server/processing unit 118 is broken;

Behavior Module 172—edge computing module sending eating reports for each of the animals; and Alert/Notification Module 174—module with parameters (which may receive periodic updates) of what data needs to be sent to the server/processing unit 118 and when (e.g., time and/or how often) the data should be sent.

Figure 4:
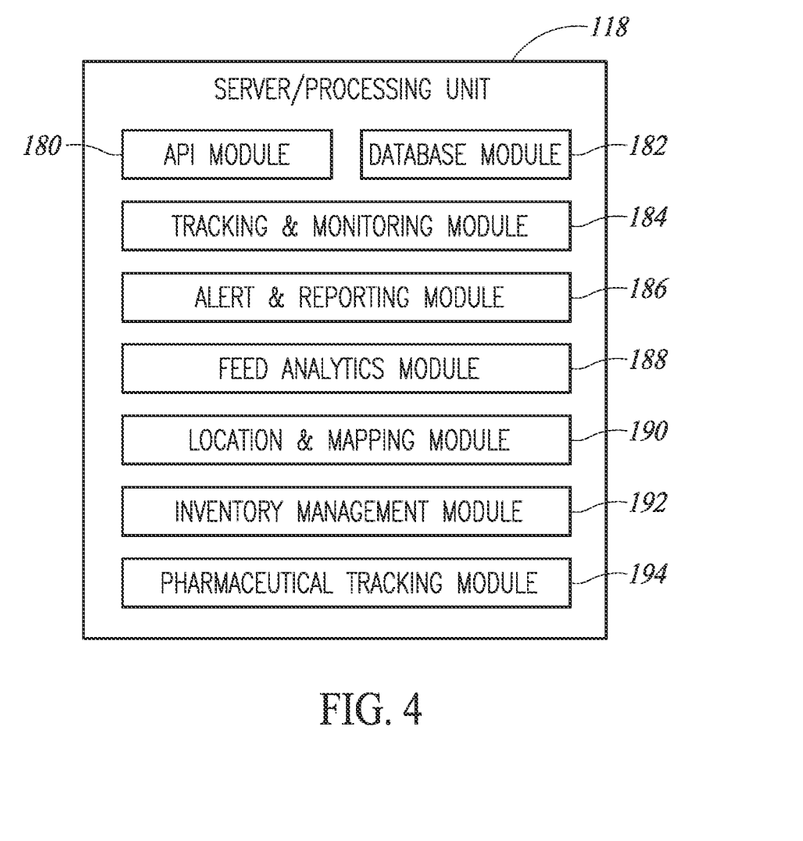
FIG. 4 illustrates an exemplary embodiment of the Server/Processing Unit with various components.

FIG. 4 is a functional block diagram of the server/processing unit 118. The server/processing unit 118 may be located in the "Cloud" or in the office server location. It can be remotely accessed by the user. The server/processing unit 118 also includes conventional computer components, such as a CPU and memory discussed above with respect to the target object sensor 112. For the sake of brevity, these components are not show in FIG. 4. Components illustrated in FIG. 4 include:

API Module 180—like the API Module 168 (see FIG. 3) in the DACU 114, the API Module in the server/processing unit 118 provides interoperability that permits networks/systems/components written in different languages to talk with each other;

Database Module 182—all data retrieved and received from the target object sensor 112 is captured and stored in the database module;

Tracking and Monitoring Module 184—tracking movement of animals from pen to pen and within a pen is registered using this unit;

Alert and Reporting Module 186—this module permits the user to select the parameters to be monitored based on the location of each animal, and based on the residual pharmaceutical levels in each animals;

Feed Analytics Module 188—machine learning based system used to understand actual amounts and type of feeds consumed by each animal, and then comparison analysis to the norm per animal and herd;

Location and Mapping Module 190—combines data from different sources, such as the DACU 114, a weather report or data from sensors analyzed by the weather module 166 (see FIG. 3), historical data, and the like to correlate and understand what is "normal behavior" for the animals, such as normal movement/location in January when it is below freezing compared to normal movement/location in July when it may be over 100 degrees and how such external conditions affect behavior of the animals;

Inventory Management Module 192 stores and maintains historical data from animals already sent to packing plants; and Pharmaceutical Tracking Module 194—key pharmaceutical data is recorded and compared to industry data to send to the alert and reporting module.

The system may record and analyze feeding and water related data generated in the above situations. Analysis and processing of the data may be performed either locally on mobile computing devices or on remote servers. Sophisticated statistical methods may be employed including machine learning and the like in order to detect and track unsafe conditions and the root causes thereof. The results of the processing and analysis may be provided to customers as simple visualizations on a configurable real-time dashboard that employees and managers may use to easily assess the eating habits of individual animals. If a user wants a more detailed review of the data, the user can access the data set from any internet login to the data set through the API module and see critical information about each animal directly in the data base module, or access any of the analytics in the feed analytics module or pharmaceutical module.

One embodiment may include a magnetic system wherein the emitter unit 116 is a permanent magnet or electromagnet and the detector portion (i.e., the target object sensor 112) sensors 136 include a magnetometer that measures a magnetic field where a magnet is placed with a negative, or positive field, and the emitter unit 116 is a magnetic component that emits a magnetic field greater than the strength of the Earth's magnetic field. When the animal's head is down, which will be measured using the sensors 136, including a 3 phase accelerometer in the target object sensor 112 (e.g., an ear tag), and is a distance X close to the emitter unit 116 mounted on the feed bunk 106 or water station 108, the detected strength of the magnetic field emitted from the emitter unit 116 exceeds a predetermined threshold level that is greater than the strength of the Earth's magnetic field, indicating that the animal is eating at the feed bunk 106 or drinking at the water station 108. The amount of time each animal spends at the feed bunk 106 or water station 108 is recorded.

In another embodiment, the target object sensor 112 may include a radiation system wherein the sensors 136 include a radiation detection system and the emitter unit 116 is a radioactive source instead of a magnet. The radioactive source would consist of a radioactive isotope that emits radiation in the form of gamma rays and/or neutrons. When the animal's head is down, which will be measured using the sensors 136, including a 3 phase accelerometer in the target object sensor 112 (e.g., an ear tag), and is a distance X close to the emitter unit 116 mounted on the feed bunk 106 or water station 108, the detected strength of the emitted radiation from the emitter unit 116 exceeds a predetermined threshold level, indicating that the animal is eating at the feed bunk 106 or drinking at the water station 108. The amount of time each animal spends at the feed bunk 106 or water station 108 is recorded.

In yet another embodiment, the emitter unit 116 may include an electromagnetic generator wherein the target object sensor 112 include a magnetic detection system wherein the sensors 136 includes a magnetometer that measures a magnetic field where the electromagnetic generator in the emitter unit 116 creates a pattern of electromagnetic pulses that emits a magnetic field greater than the strength of the Earth's magnetic field. When the animal's head is down, which will be measured using the sensors 136, including a 3 phase accelerometer in the target object sensor 112 (e.g., an ear tag), and is a distance X close to the emitter unit 116 mounted on the feed bunk 106 or water station 108, the detected strength of the magnetic field emitted from the emitter unit 116 exceeds a predetermined threshold level and pattern that is greater than the strength of the Earth's magnetic field, indicating that the animal is eating at the feed bunk 106 or drinking at the water station 108. The amount of time each animal spends at the feed bunk 106 or water station 108 is recorded.

The final embodiment is when an animal is administered any pharmaceutical, the time and duration of the pharmaceutical is entered into the data system referencing the individual animal. That data is stored in the pharmaceutical tracking module 194 in the server/processing unit 118. If the animal in question is brought to be loaded for shipment to the packing plant, at least one of the LED lights 112a on the target object sensor 112 (e.g., the ear tag) will light notifying the feedlot staff that this animal still has residual pharmaceuticals in its system and the feedlot staff can then check the records for the specific date on which the animal can travel.

The system may record critical consumption related metrics:
1) Bunk visit (BV) frequency,
2) BV duration,
3) Bunk head down (BHD) duration,
4) Maximal nonfeeding interval (NFI Max),
5) Standard deviation of non-feeding interval (NFI SD),
6) Trough visit (TV) (i.e., watering station) frequency,
7) TV duration, and
8) Trough head down duration (THD).

Thus, the system described herein can automatically monitor certain activities of each animal in the feedlot and generate a warning signal in the event that the any activity, or lack or activity, should be called to the attention of the feedlot staff. Although the examples presented herein relate to cattle, those skilled in the art will appreciate that the principles can be applied to other livestock, such as hogs, sheep, and the like. The present disclosure is not limited to any specific species of animal.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system for monitoring activity of a plurality of animals, comprising:
 a battery-operated target object sensor unit, attachable to each of the plurality of animals, and comprising:
  a wireless transceiver;
  a plurality of sensors;
  a processing unit; and
  an alert indicator configured to provide a user-detectable alert signal;
 an emitter unit positioned at a designated location on a feed bunker and on a water station, the emitter unit being configured to emit a signal detectable by a first of the plurality of sensors whenever one of the plurality of animals is within a designated distance of the emitter unit to thereby determine a quantity of time that each of the plurality of animals are consuming feed at the feed bunker and consuming water at the water station;
 a data acquisition and communication unit (DACU), comprising:
  a short-range communication module for communicating with the wireless transceiver in the target object sensor unit;
  a processing unit configured to receive and process data received from the plurality of sensors; and
  a communication module configured for remote communication; and
 a server/processing unit communicatively coupled to the DACU, the server/processing unit comprising:
  a feed analytics module configured to receive sensor data from the sensors in the target object sensor unit of each of the plurality of animals and to determine type and quantity of feeds consumed by each of the plurality of animals;
  a pharmaceutical tracking module configured to receive pharmaceutical administration data, including type, quantity, time, and date of administration for each of the plurality of animals, the pharmaceutical tracking module being further configured to compare the pharmaceutical administration data with industry data related to administered pharmaceutical; and
  an alert and reporting module configured to monitor the location of each of the plurality of animals and, based on residual pharmaceutical levels in each of the plurality of animals, generating an alert if a first of the plurality of animals is prepared for shipping while residual pharmaceutical levels in the first of the plurality of animals are above a predetermined level,
 wherein the generated alert is communicated from the server/processing unit to the alert indicator in the target object sensor unit attached to the first of the plurality of animals to provide the user-detectable alert signal that the residual pharmaceutical levels in the first of the plurality of animals are above the predetermined level.

2. The system of claim 1 wherein the user-detectable alert signal is a visible light indicator on the target object sensor unit.

3. The system of claim 1 wherein the alert and reporting module is further configured to monitor the quantity of feed and water consumed by each of the plurality of animals based on the plurality of sensors, the alert and reporting module and generating an alert if any of the plurality of animals is consuming an abnormal quantity of feed or water, wherein the generated alert is communicated to the alert indicator in the target object sensor unit attached to any of the plurality of animals consuming an abnormal quantity of feed or water to provide the user-detectable alert signal that one of the plurality of animals is consuming an abnormal quantity of feed or water.

4. The system of claim 1, further comprising a relay transceiver positioned within communication range of the wireless transceiver in the target object sensor unit to communicate therewith, the relay transceiver also being within communication range of the short-range communication module of the DACU such that the relay transceiver is operable to relay communications between the wireless transceiver in the target object sensor unit and the short-range communication module of the DACU.

5. The system of claim 1 wherein the DACU further comprises a weather module to analyze local weather data based on weather-related sensors in the DACU or weather-related data received from a remote source.

6. The system of claim 1 wherein the DACU further comprises a tracking and monitoring module configured to receive sensor data from the sensors in the target object sensor unit of each of the plurality of animals and to track movement of each of the plurality of animals to temporarily maintain localized data monitoring and tracking of each of the plurality of animals if a communication channel between the DACU and the server/processing unit is disrupted.

7. The system of claim 1 wherein the DACU further comprises a behavior computing module configured to send eating reports, based on sensor data, for each of the plurality of animals to the server/processing unit.

8. The system of claim 1 wherein the DACU further comprises a notification computing module configured to store operational parameters indicative of data required for transmission to the server/processing unit and frequency of data transmissions to the server/processing unit.

9. The system of claim 8 wherein the notification computing module configured to receive and store updated operational parameters indicative of changes in the data required for transmission to the server/processing unit and the frequency of data transmissions to the server/processing unit.

10. The system of claim 1 wherein the server/processing unit further comprises a tracking and monitoring module configured to receive sensor data from the sensors in the target object sensor unit of each of the plurality of animals and to track movement of each of the plurality of animals based thereon.

11. The system of claim 1 wherein the feed analytics module is further configured to compare the determined type and quantity of feeds consumed by each of the plurality of animals with predetermined normal quantities of feeds consumed per animal.

12. The system of claim 11 wherein the feed analytics module is further configured to compare the determined type and quantity of feeds consumed by each of the plurality of animals with predetermined normal quantities of feeds consumed per animal, the alert and reporting module being further configured to generate an alert if any of the plurality of animals is consuming an abnormal quantity of feed, wherein the generated alert is communicated to the alert indicator in the target object sensor unit attached to any of the plurality of animals consuming an abnormal quantity of feed to provide the user-detectable alert signal that one of the plurality of animals is consuming an abnormal quantity of feed.

13. The system of claim 1 wherein the DACU further comprises a tracking and monitoring module configured to receive sensor data from the sensors in the target object sensor unit of each of the plurality of animals and to track movement of each of the plurality of animals to temporarily maintain localized data monitoring and tracking of each of the plurality of animals if a communication channel between the DACU and the server/processing unit is disrupted.

14. A system for monitoring activity of an animal, comprising:
  a battery-operated target object sensor unit, attachable to the animal, and comprising:
    a plurality of sensors configured to detect a position of the animal with respect to a feed bunker and with respect to a water station;
    a wireless transceiver configured to transmit sensor data to a remote processor; and
    an alert indicator configured to provide a user-detectable alert signal;
  a feed analytics module in the remote processor configured to receive sensor data from the sensors in the target object sensor unit and to determine type and quantity of feeds consumed by the animal;
  a pharmaceutical tracking module in the remote processor configured to receive pharmaceutical administration data, including type, quantity, time, and date of administration of the pharmaceutical to the animal, the pharmaceutical tracking module being further configured to compare the pharmaceutical administration data with industry data related to administered pharmaceutical; and
  an alert and reporting module in the remote processor configured to monitor the location of the animal and generating an alert if the animal is prepared for shipping while residual pharmaceutical level in the animal is above a predetermined level,
  wherein the generated alert is communicated from the remote processor to the alert indicator in the target object sensor unit attached to the animal to provide the user-detectable alert signal that the residual pharmaceutical level in the animal is above the predetermined level.

15. The system of claim 14, further comprising a relay transceiver positioned within communication range of the wireless transceiver in the target object sensor unit to communicate therewith, the relay transceiver also being within communication range of a short-range communication module associated with the remote processor such that the relay transceiver is operable to relay communications between the wireless transceiver in the target object sensor unit and the short-range communication module of the remote processor.

16. The system of claim 14 wherein the remote processor further comprises a tracking and monitoring module configured to receive sensor data from the sensors in the target object sensor unit of the animal and to track movement of the animal based thereon.

17. The system of claim 14 wherein the feed analytics module is further configured to compare the determined type and quantity of feeds consumed by the animal with predetermined normal quantities of feeds consumed by the animal.

18. A method for monitoring activity of a plurality of animals, comprising:
  attaching a battery-operated target object sensor unit to each of the plurality of animals;
  using a plurality of sensors in the target object sensor unit to generate sensor data for monitoring feed consumption of each of the plurality of animals at a feed bunker;
  using a plurality of sensors in the target object sensor unit to generate sensor data for monitoring water consumption of each of the plurality of animals at a water station;
  using a wireless transceiver in the target object sensor unit to transmit the generated sensor data for monitoring feed consumption and the generated sensor data for monitoring water consumption for each of the plurality of animals;
  a data acquisition and communication unit (DACU) receiving the transmitted sensor data from the sensors in the target object sensor unit of each of the plurality of animals and determining a quantity of feed and water consumed by each of the plurality of animals;
  comparing the quantity of feed and water consumed by each of the plurality of animals with a normal quantity of feed and water consumption;
  activating a user-detectable alert on the target object sensor unit of any of the plurality of animals for which the comparing the quantity of feed and water consumption with the normal quantity of feed and water consumption indicates an abnormal level of feed or water consumption;
  tracking pharmaceutical administration data, including type, quantity, time, and date of administration for each of the plurality of animals;
  comparing the pharmaceutical administration data for each of the plurality of animals with industry data related to residual pharmaceutical levels of the administered pharmaceutical;
  monitoring the location of each of the plurality of animals and, based on comparing the pharmaceutical administration data for each of the plurality of animals with residual pharmaceutical levels of the administered pharmaceutical, generating an alert for any of the plurality of animals being prepared for shipping while residual pharmaceutical levels are above a predetermined level; and activating the user-detectable alert on the target object sensor unit of any of the plurality of animals being prepared for shipping while residual pharmaceutical levels are above a predetermined level.

19. The method of claim 18 wherein using the wireless transceiver in the target object sensor unit to transmit the generated sensor data comprises transmitting the generated sensor data from the target object sensor unit on each of the plurality of animals to a relay transceiver positioned within communication range of the wireless transceiver in the target object sensor unit to communicate therewith, the relay transceiver also being within communication range of the DACU such that the relay transceiver is operable to relay communications between the wireless transceiver in the target object sensor unit and the DACU.

20. The method of claim 19 wherein the DACU transmits the generated sensor data received from the target object sensor units on each of the plurality of animals to a server/processing unit for analysis and display.

21. The method of claim 20 wherein the DACU stores operational parameters indicative of data required for transmission to the server/processing unit and frequency of data transmissions to the server/processing unit.

22. The method of claim 21, further comprising updating the operational parameters indicative of changes in the data required for transmission to the server/processing unit and the frequency of data transmissions to the server/processing unit.

23. The method of claim 18, further comprising using weather-related sensors or weather-related data received from a remote source to analyze local weather wherein comparing the quantity of feed and water consumed by each of the plurality of animals with a normal quantity of feed and water consumption is adjusted based on the analysis of local weather.

* * * * *